(12) United States Patent
Maharaja

(10) Patent No.: US 11,531,709 B2
(45) Date of Patent: Dec. 20, 2022

(54) DYNAMIC BLOCKCHAIN MASKING AND VERIFICATION COMPUTING PLATFORM

(71) Applicant: Bank of America Corporation, Charlotte, NC (US)

(72) Inventor: Raja Arumugam Maharaja, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 56 days.

(21) Appl. No.: 17/178,574

(22) Filed: Feb. 18, 2021

(65) Prior Publication Data
US 2022/0261441 A1    Aug. 18, 2022

(51) Int. Cl.
| | |
|---|---|
| G06F 16/00 | (2019.01) |
| G06F 16/9035 | (2019.01) |
| G06F 16/242 | (2019.01) |
| H04L 9/06 | (2006.01) |
| G06F 16/27 | (2019.01) |
| H04L 9/00 | (2022.01) |

(52) U.S. Cl.
CPC ...... *G06F 16/9035* (2019.01); *G06F 16/2428* (2019.01); *G06F 16/27* (2019.01); *H04L 9/0618* (2013.01); *H04L 9/50* (2022.05)

(58) Field of Classification Search
CPC ... G06F 16/27; G06F 16/9035; G06F 16/2428
See application file for complete search history.

(56) References Cited

U.S. PATENT DOCUMENTS

| | | | |
|---|---|---|---|
| 2018/0082020 A1* | 3/2018 | Rajagopal | G06F 21/6254 |
| 2019/0207750 A1 | 7/2019 | Harvey | |
| 2019/0370358 A1 | 12/2019 | Nation et al. | |
| 2019/0379642 A1* | 12/2019 | Simons | H04L 63/0414 |
| 2020/0228321 A1* | 7/2020 | Krishnamacharya | H04L 9/3231 |
| 2021/0264054 A1* | 8/2021 | Anson | G06F 21/725 |

* cited by examiner

*Primary Examiner* — Khanh B Pham
(74) *Attorney, Agent, or Firm* — Banner & Witcoff, Ltd.

(57) ABSTRACT

Aspects of the disclosure relate to dynamic record masking in a blockchain system. A computing platform may receive an input dataset. The computing platform may generate a plurality of records based on data from the input dataset. The computing platform may generate one or more masked records based on the plurality of records and masking settings. The computing platform may send the records and/or masked records to destination computing platforms. The computing platform may receive notifications from the destination computing platforms indicating the records and/or masked records have been verified. The computing platform may send messages comprising instructions to the destination computing platforms to add the records or masked records to their distributed ledgers. The computing platform may send an instruction to a database platform to update one or more tables with the record.

16 Claims, 12 Drawing Sheets

305

Dynamic Blockchain Masking Configuration Interface

Select Dynamic Blockchain Masking Preferences

Uniform Masking ☐

Custom Masking ☐

Select Data Field(s) for Masking

|  | Mask | Do Not Mask |
|---|---|---|
| Data Field 1 | ☐ | ☐ |
| Data Field 2 | ☐ | ☐ |
| Data Field 3 | ☐ | ☐ |
| • | • | • |
| • | • | • |
| • | • | • |
| Data Field N | ☐ | ☐ |

Complete Configuration

Dynamic Blockchain Masking Configuration Interface

Select Record Source:

Computing Platform 1 ☐          Computing Platform 3 ☐

Computing Platform 2 ☐          Computing Platform 4 ☐

Select Record Destination:

Computing Platform 1 ☐          Computing Platform 3 ☐

Computing Platform 2 ☐          Computing Platform 4 ☐

Destination Computing Platform 1

|  | Mask | Do Not Mask |
|---|---|---|
| Data Field 1 | ☐ | ☐ |
| Data Field 2 | ☒ | ☐ |
| Data Field 3 | ☐ | ☒ |
| Data Field 4 | ☐ | ☒ |

Block 1

| Previous Hash | Data | | | | ID |
|---|---|---|---|---|---|
| | Data A | ####### | Data B | Data C | 11 |

Source Computing Platform 1

|  | Mask | Do Not Mask |
|---|---|---|
| Data Field 1 | ☐ | ☐ |
| Data Field 2 | ☒ | ☐ |
| Data Field 3 | ☐ | ☒ |
| Data Field 4 | ☒ | ☐ |

| Previous Hash | Block 2 |||||
|---|---|---|---|---|---|
|  | Data |||| ID |
|  | Data A | ####### | Data B | ####### | 12 |

FIG. 3G

DYNAMIC BLOCKCHAIN MASKING AND VERIFICATION COMPUTING PLATFORM

BACKGROUND

Aspects of the disclosure relate to dynamic masking of blockchain records. In particular, one or more aspects of the disclosure relate to generating masked records and verifying the masked records prior to storing those masked records in distributed ledgers.

In some cases, enterprise organizations may use multiple distributed ledgers to maintain records. In these instances, the records may include confidential or sensitive data. Sending these records to multiple systems for subsequent storage in those distributed ledgers unnecessarily exposes the confidential data stored in those records. This may result in substantial privacy breaches. To improve the security of blockchain systems, there is a need for a platform that dynamically generates masked records prior to verifying and storing those records in distributed ledgers.

SUMMARY

Aspects of the disclosure provide effective, efficient, scalable, and convenient technical solutions that address and overcome the technical problems associated with conventional blockchain record processing. In accordance with one or more embodiments of the disclosure, a computing platform comprising at least one processor, a communication interface, and memory storing computer-readable instructions may receive an input dataset. The computing platform may generate, for a first computing platform and based on the input dataset, a first record. The computing platform may generate, for a second computing platform and based on the input dataset, a second record. The computing platform may selectively mask, based on a first one or more masking settings, the first record, wherein selectively masking the first record produces a first masked record. The computing platform may selectively mask, based on a second one or more masking settings, the second record, wherein selectively masking the second record produces a second masked record. The computing platform may send the first record to the first computing platform. The computing platform may send the second record to the second computing platform. The computing platform may receive a first record verification from the first computing platform. The computing platform may receive a second record verification from the second computing platform. In response to receiving the first record verification from the first computing platform and receiving the second record verification from the second computing platform, the computing platform may send a first message to the first computing platform, the first message comprising a first instruction to update a first distributed ledger with the first masked record. In response to receiving the first record verification from the first computing platform and receiving the second record verification from the second computing platform, the computing platform may send a second message to the second computing platform, the second message comprising a second instruction to update a second distributed ledger with the second masked record.

In one or more instances, the computing platform may send an instruction to an enterprise database platform to store data from the input dataset. In one or more instances, the computing platform may receive the input dataset from enterprise database platform.

In one or more instances, the computing platform may generate a graphical user interface comprising a first selectable masking option and a second selectable masking option. The computing platform may send the graphical user interface to a display device, wherein sending the graphical user face to the display device causes the display device to display the graphical user interface. The computing platform may, in response to receiving, from the display device and via the graphical user interface, a selection of the first selectable masking option, generate a second graphical user interface comprising a plurality of data fields. The computing platform may send the second graphical user interface to the display device, wherein sending the second graphical user face to the display device causes the display device to display the second graphical user interface. The computing platform may receive, from the display device and via the second graphical user interface, a second selection of a first data field of the plurality of data fields, and the first one or more masking settings may comprise an indication that a data field in the first record corresponding to the first data field is to be masked.

In one or more instances, the computing platform may, in response to receiving, from the display device and via the graphical user interface, a selection of the second selectable masking option, generate a second graphical user interface, the second graphical user interface comprising a plurality of selectable source computing platforms and a plurality of destination computing platforms. The computing platform may send the second graphical user interface to the display device, wherein sending the second graphical user interface to the display device causes the display device to display the second graphical user interface. In response to receiving, from the display device and via the graphical user interface, a selection of a second destination computing platform, the computing platform may generate a third graphical user interface, the third graphical user interface comprising a plurality of data fields. The computing platform may send the third graphical user interface to the display device, wherein sending the third graphical user face to the display device causes the display device to display the third graphical user interface. The computing platform may receive, from the display device and via the third graphical user interface, a second selection of a second data field of the plurality of data fields, and the second one or more masking settings may comprise an indication that a data field in the second record corresponding to the second data field is to be masked.

In one or more instances, the computing platform may generate, for a third destination computing platform and based on the input dataset, a third record. The computing platform may, in response to determining, based on a third or more masking settings, that the third record is to be sent without masking, send the third record to the third destination computing platform.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3G depict illustrative graphical user interfaces that implement a dynamic blockchain masking and verification computing platform in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to a dynamic blockchain masking and verification computing platform. To improve the security, privacy, efficiency, and speed of data storage, an enterprise may implement a blockchain-based storage system. For example, the enterprise may implement private blockchains using distributed ledgers. In such a system, multiple computing systems may store copies of records in their ledgers. This may require that the enterprise send the records to each of these computing systems. This, in turn, may repeatedly expose the data stored in those records. In many cases, these records may store confidential and sensitive data. Thus, implementation of a blockchain storage system may result in substantial security breaches due to the substantial number of computing platforms that are sending, receiving, and analyzing the confidential records.

In a blockchain system, a record is may not be added to distributed ledgers until each computing system associated with the distributed ledgers verifies the data in the record. In many cases, this verification may be based only on a subset of the data in any given record. Accordingly, aspects described here may employ dynamic data masking for blockchain storage systems. Specifically, before records are sent to the computing platforms for verification, the dynamic blockchain masking computing platform may selectively mask each of the records. The masking may be uniformly applied to each individual record (i.e., regardless of the source of the record and/or the destination of the record). Alternatively, the masking of each individual record may be dynamically customized based on the record source and/or the record destination. Aspects of the present disclosure thus allow for a system that may enjoy the many advantages of blockchain storage without compromising the confidentiality or security of the records.

Figure 1A:
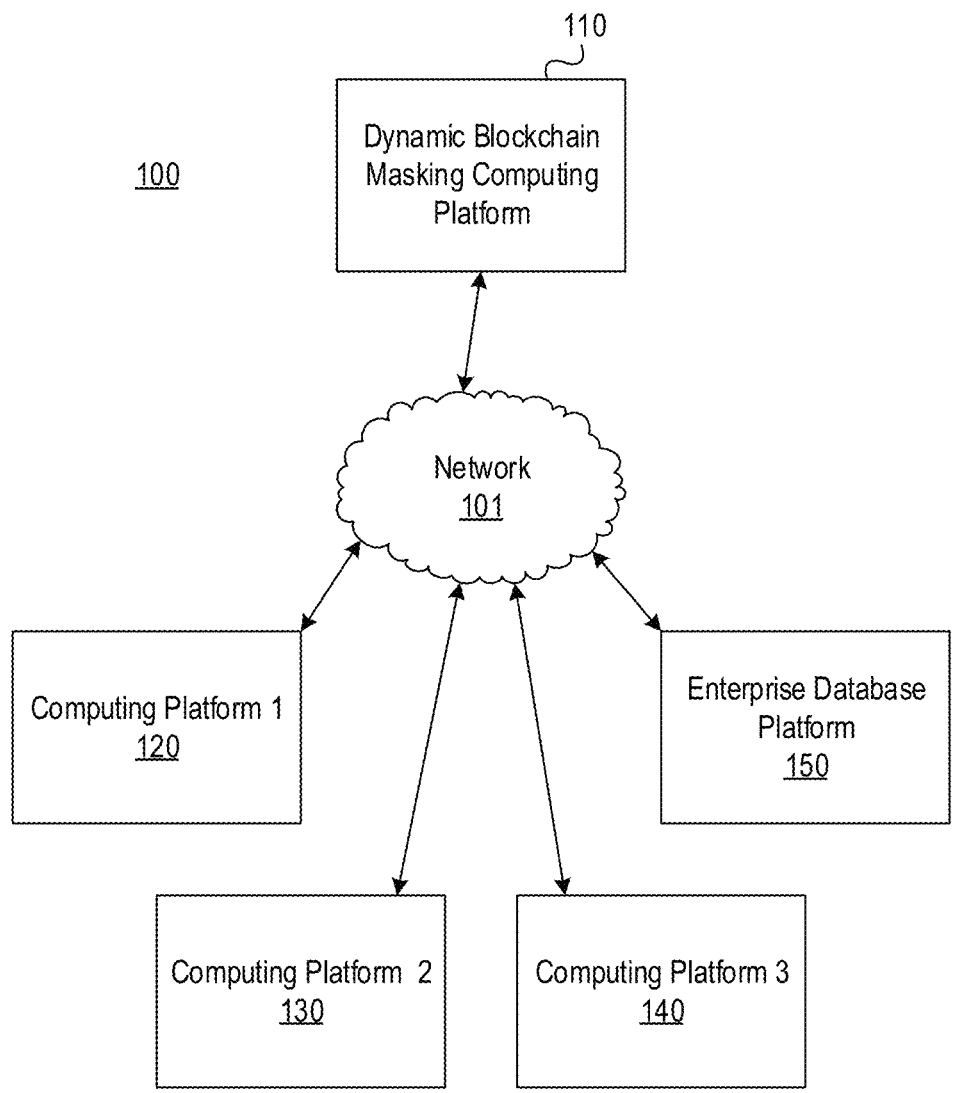
FIGS. 1A-1B depict an illustrative computing environment for implementing a dynamic blockchain masking and verification computing platform in accordance with one or more example embodiments.
Figure 1B:
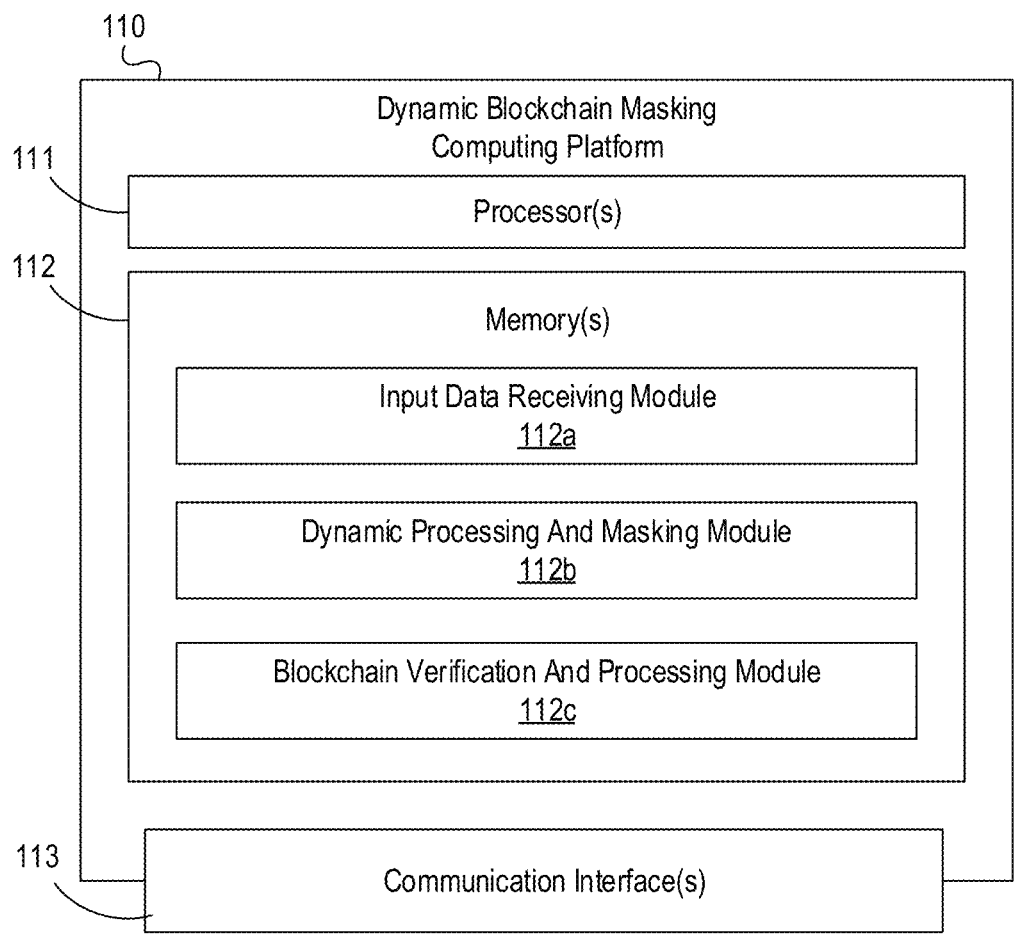

FIGS. 1A-1B depict an illustrative computing environment that implements a dynamic blockchain masking and verification computing platform in accordance with one or more example embodiments. Referring to FIG. 1A, computing environment 100 may include one or more computer systems. For example, computing environment 100 may include a dynamic blockchain masking computing platform 110, computing platform 120, computing platform 130, computing platform 140, and enterprise database platform 150.

As described further below, dynamic blockchain masking computing platform 110 may be a computer system that includes one or more computing devices (e.g., servers, server blades, or the like) and/or other computer components (e.g., processors, memories, communication interfaces) that may be used to identify, generate, and maintain one or more distributed ledgers. In some instances, dynamic blockchain masking computing platform 110 may be controlled or otherwise maintained by an enterprise organization such as a financial institution.

Computing platform 120 may be a computer system that includes one or more computing devices (e.g., servers, server blades, laptop computers, desktop computers, mobile devices, tablets, smartphones, credit card readers, or the like) and/or other computer components (e.g., processors, memories, communication interfaces) that may be used to perform enterprise operations and/or event processing. In one or more instances, computing platform 120 may be configured to communicate with dynamic blockchain masking computing platform 110 for record verification. Computing platform 130 and computing platform 140 may be computing platforms similar to computing platform 120.

Enterprise database platform 150 may comprise one or more servers or computer systems that stores one or more databases. The data stored in the databases of enterprise database platform 150 may include any of the records stored in computing platform 120, computing platform 130, computing platform 140, as well as any additional data of the enterprise. The databases stored on enterprise database platform 150 may be accessed by and/or modified by any of dynamic blockchain masking computing platform 110, computing platform 120, computing platform 130, and computing platform 140.

Computing environment 100 also may include one or more networks, which may interconnect dynamic blockchain masking computing platform 110, computing platform 120, computing platform 130, computing platform 140, and enterprise database platform 150. For example, computing environment 100 may include a network 101 (which may interconnect, e.g., dynamic blockchain masking computing platform 110, computing platform 120, computing platform 130, computing platform 140, and enterprise database platform 150).

In one or more arrangements, dynamic blockchain masking computing platform 110, computing platform 120, computing platform 130, computing platform 140, and enterprise database platform 150 may be any type of computing device capable of sending and/or receiving requests and processing the requests accordingly. For example, dynamic blockchain masking computing platform 110, computing platform 120, computing platform 130, computing platform 140, and enterprise database platform 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic blockchain masking computing platform 110, computing platform 120, computing platform 130, computing platform 140, and enterprise database platform 150, may, in some instances, be special-purpose computing devices configured to perform specific functions.

Referring to FIG. 1B, dynamic blockchain masking computing platform 110 may include one or more processors 111, memory 112, and communication interface 113. A data bus may interconnect processor 111, memory 112, and communication interface 113. Communication interface 113 may be a network interface configured to support communication between dynamic blockchain masking computing platform 110 and one or more networks (e.g., network 101, or the like). Memory 112 may include one or more program modules having instructions that when executed by processor 111 cause dynamic blockchain masking computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of dynamic blockchain masking computing platform 110 and/or by different computing devices that may form and/or otherwise make up dynamic blockchain masking computing platform 110. For example, memory 112 may have, host, store, and/or include input data receiving module 112a, dynamic processing and masking module 112b, and blockchain verification and processing module 112c.

Input data receiving module 112a may have instructions that direct and/or cause dynamic blockchain masking computing platform 110 to receive input data from any of the computing platforms shown in FIG. 1A (i.e., computing platform 120, computing platform 130, computing platform 140, and enterprise database platform 150). Dynamic processing and masking module 112b may analyze the data received from input data receiving module 112a and generate blockchain records and/or masked blockchain records based on masking settings. Blockchain verification and processing module 112c may verify and process the blockchain records and/or masked blockchain records prior to instructing various computing platforms (i.e., computing platform 120, computing platform 130, computing platform 140, and/or enterprise database platform 150) to add these records to distributed ledgers maintained by those computing platforms.

Figure 2A:
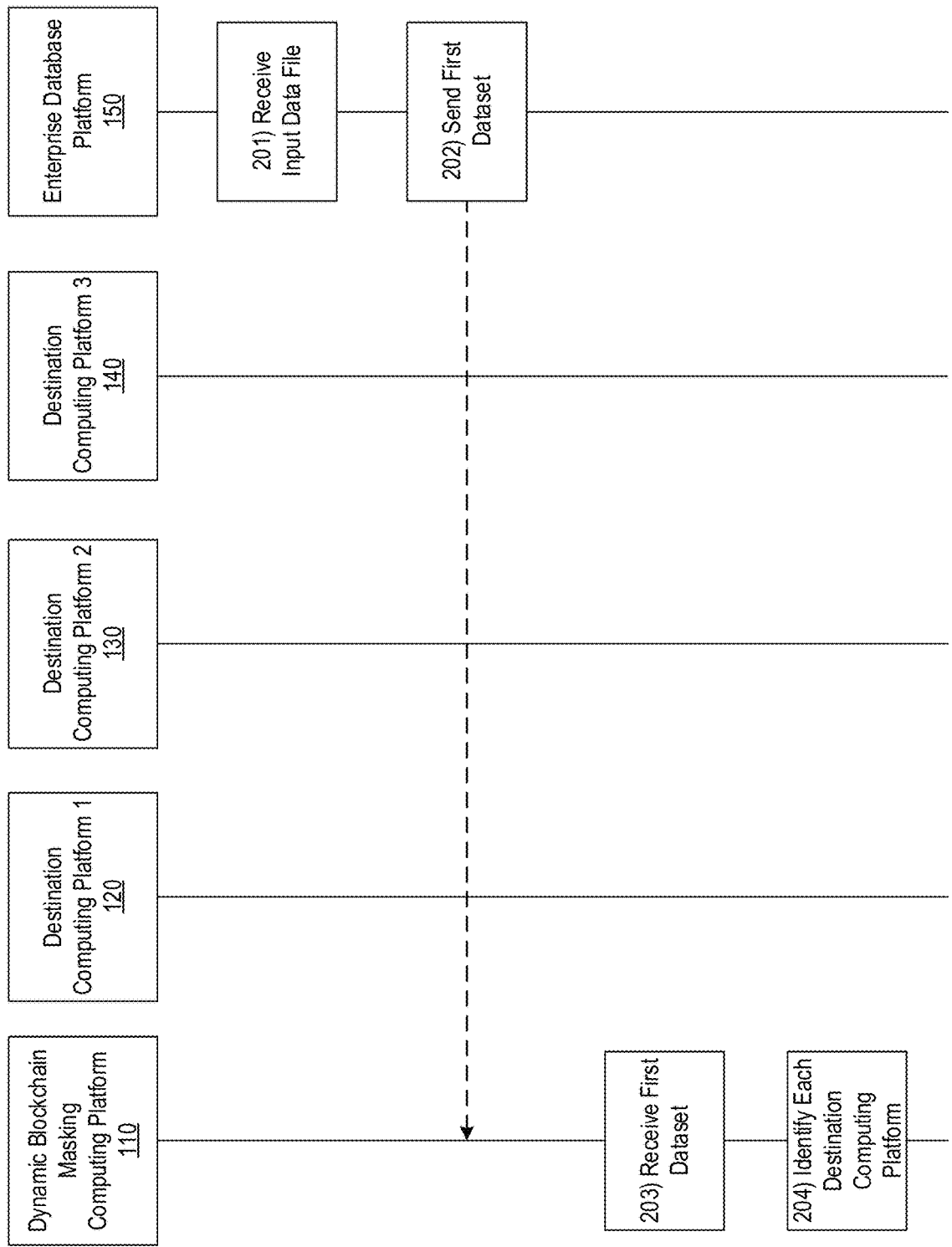
FIGS. 2A-2E depict an illustrative event sequence for implementing a dynamic blockchain masking and verification computing platform in accordance with one or more example embodiments.

FIGS. 2A-2D depict an illustrative event sequence for implementing a dynamic blockchain masking and verification computing platform in accordance with one or more example embodiments. Referring to FIG. 2A, at step 201, enterprise database platform 150 may receive an input data file. Enterprise database platform 150 may receive the input data file from any of computing platform 120 ("source computing platform 120"), computing platform 130 ("source computing platform 130"), and/or computing platform 140 ("source computing platform 140"). Alternatively, the input data file may be received by any of dynamic blockchain masking computing platform 110, computing platform 120, computing platform 130, and/or computing platform 140.

The input data file may comprise data that is to be stored as a record in one or more distributed ledgers. The data may comprise an indication of the source computing platform (e.g., source computing platform 120, source computing platform 130, or source computing platform 140). The input data file may also comprise a listing of one or more computing platforms that maintain the distributed ledgers in which the record is to be stored. For example, the input data file may indicate that the data is to be sent to computing platform 120 ("destination computing platform 120"), computing platform 130 ("destination computing platform 130"), and/or computing platform 140 ("destination computing platform 140"). The input data file may also comprise one or more masking settings for the record.

Enterprise database platform 150 may generate a first dataset based on the contents of the input data file. The first dataset may comprise the data that is to be stored as a record in one or more distributed ledgers (including the source of the data). The first dataset may additionally comprise the listing of destination computing platforms from the input data file and the one or more masking settings from the input data file. Alternatively, the listing of the destination computing platforms and/or the one or more masking settings may be determined by enterprise database platform 150 (for example, these may be dynamically determined by enterprise database platform 150 based on the data, the source computing platform 120 and/or the destination computing platforms). In one example, the masking settings are received by enterprise database platform 150 using the graphical user interfaces shown in FIGS. 3A-3G, discussed in further detail below. The dynamic blockchain masking computing platform 110 may generate the graphical user interfaces shown in FIGS. 3A-3G and send the graphical user interfaces to enterprise database platform 180. The sending of the graphical user interfaces from dynamic blockchain masking computing platform 110 to enterprise database platform 180 may cause enterprise database platform 180 to output the graphical user interfaces to a display device. One or more user selections may be received through the graphical user interface. These user selections may be sent to the dynamic blockchain masking computing platform 110, which may receive the user selections received through the graphical user interface.

At step 202, enterprise database platform 150 may send the first dataset to dynamic blockchain masking computing platform 110. At step 203, dynamic blockchain masking computing platform 110 may receive the first dataset from enterprise database platform 150.

At step 204, dynamic blockchain masking computing platform 110 may determine which destination computing platforms are to receive a record (comprising the data from the first dataset) for storage in its distributed ledger. In one example, the list of destination computing platform may be extracted from the first dataset. In another example, dynamic blockchain masking computing platform 110 may independently determine the list of destination computing platforms. Dynamic blockchain masking computing platform 110 may make this determination dynamically, based on the data and/or one or more stored settings associated the data.

Figure 2B:
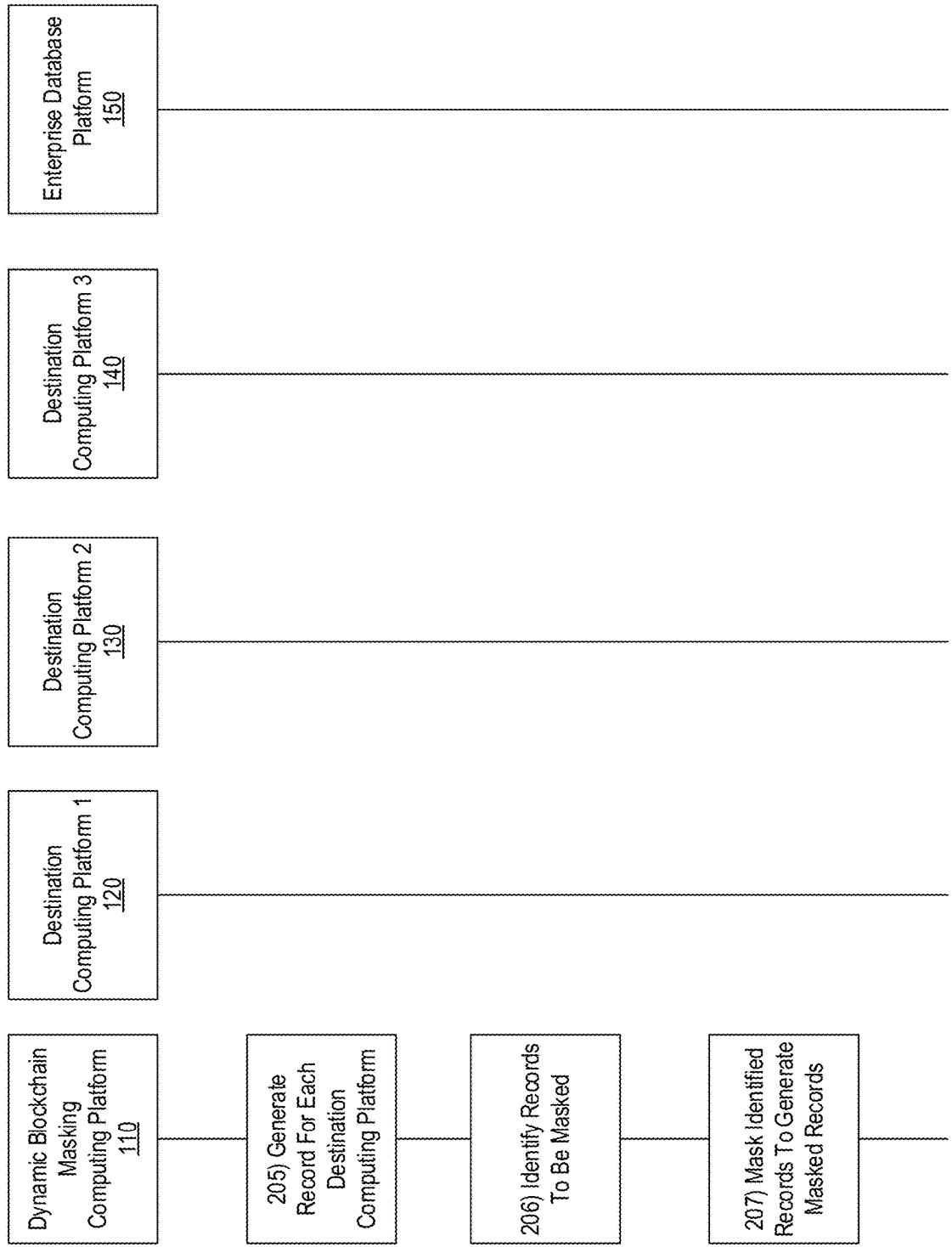

Referring to FIG. 2B, at step 205, enterprise database platform 150 may generate a separate record for each destination computing platform that is to receive the data. Each record generated by dynamic blockchain masking computing platform 110 may comprise the data from the first dataset. In one example, the record generated by dynamic blockchain masking computing platform 110 may supplement the data from the dataset. For example, each record generated by dynamic blockchain masking computing platform 110 may comprise the data and an additional data field identifying the particular destination computing platform that is to receive that particular record. In one example, dynamic blockchain masking computing platform 110 may generate a first record for destination computing platform 120, a second record for destination computing platform 130, and a third record for destination computing platform 140. The first record, second record, and third record may be identical but for the identification data stored therein. For example, the first record may store identification data associated with destination computing platform 120, the second record may store identification data associated with destination computing platform 130, and the third record may store identification data associated with destination computing platform 140.

At step 206, dynamic blockchain masking computing platform 110 may determine which of the records generated at step 205 are to be masked. In one example, dynamic blockchain masking computing platform 110 may extract this information from the first dataset received from enterprise database platform 150.

In another example, dynamic blockchain masking computing platform 110 may make this determination based on one or more masking settings. These masking settings may be associated with the contents of a record, the destination computing platform(s) for the record, and/or the source computing platform of the data in the record. That is, a record may include a plurality of data fields. In one example, the masking settings may indicate specific data fields to be masked uniformly across all records. In another example, the masking settings may indicate, for a particular destination computing platform, which data fields are to be masked. In one example, the masking settings may indicate specific data fields to be masked uniformly across all records. In another example, the masking settings may indicate, for a particular source computing platform, which data fields are to be masked. In another example, the masking settings may indicate, for a particular combination of source computing platform and destination computing platform, which data fields are to be masked.

These masking settings may have been previously received by dynamic blockchain masking computing platform 110 or be received by dynamic blockchain masking computing platform 110 in real-time (e.g., when receiving the first dataset or when processing the first dataset to determine the destination computing platforms for the data or when determining which of the records is to be masked). In one example, the masking settings may be received by dynamic blockchain masking computing platform 110 using the graphical user interfaces shown in 3A-3G, discussed in further detail below. Dynamic blockchain masking computing platform 110 may generate the graphical user interfaces and send the graphical user interfaces to a display device (such as a display device of dynamic blockchain masking computing platform 110, computing platform 120, computing platform 130, or computing platform 140). The sending of the graphical user interfaces by dynamic blockchain masking computing platform 110 to the display device (such as a display device of dynamic blockchain masking computing platform 110, computing platform 120, computing platform 130, computing platform 140, or enterprise database platform 180) may cause the display device to display the graphical user interfaces. One or more user selections for the masking settings may be received through the graphical user interfaces. These user selections may be sent to the dynamic blockchain masking computing platform 110, which may receive from the display device the user selections received through the graphical user interface. The one or more masking settings may then be configured based on the user selections received through the graphical user interfaces.

At step 207, the dynamic blockchain masking computing platform 110 may generate masked records corresponding to the identified records by selectively masking one or more data fields from one or more of the identified records based on one or more masking settings. In one instance, the masking settings may be configured such that dynamic blockchain masking computing platform 110 may apply the masking settings uniformly to all records. In this instance, the masking settings will indicate which data fields are to be masked and which data fields should remain unmasked. Accordingly, the dynamic blockchain masking computing platform 110 will selectively and uniformly mask each of the records generated at step 205 (e.g., the first record, the second record, and the third record). For example, the masking settings may indicate that only a first data field in any record from source computing platform 120 should be masked. In this example, dynamic blockchain masking computing platform 110 will mask the first data field in the first record to generate a first masked record, mask the first data field in the second record to generate a second masked record, and mask the first data field in the third record to generate a third masked record. The remaining data fields in the first, second, and third masked records (that is, all data fields except for the first data field) will remain unmasked.

In a second instance, the masking settings may be configured such that dynamic blockchain masking computing platform 110 may apply different masking settings to different records, based on the destination computing platforms associated with those different records. For example, the masking settings for destination computing platform 120 may indicate that only a first data field in records destined for destination computing platform 120 should be masked, the masking settings for destination computing platform 130 may indicate that a first data field and a second data field in records destined for destination computing platform 130 should be masked, and masking settings for destination computing platform 140 may indicate that no data fields in records destined for destination computing platform 140 should be masked.

In a third instance, the masking settings may be configured such that dynamic blockchain masking computing platform 110 may apply different masking settings to different records, based on the source computing platforms associated with those different records. For example, the masking settings may indicate that only a first data field in records comprising data from computing platform 120 should be masked, that both a first data field and a second data field in records comprising data from computing platform 130 should be masked, and all data fields except a third data field in records comprising data from computing platform 140 should be masked.

In a fourth instance, the masking settings may be configured such that dynamic blockchain masking computing platform 110 may apply different masking settings based on both the source computing platform of the data in the record and the destination computing platform of the record. For example, the masking settings may indicate which data fields in the record are to be masked if the source computing platform of the data in the record is source computing platform 120 and the destination computing platform of the record is destination computing platform 130. In another example, the masking settings may indicate which data fields in the record are to be masked if the source computing platform of the data in the record is source computing platform 120 and the destination computing platform of the record is destination computing platform 120 (e.g., the source computing platform and the destination computing platform are the same). When the source computing platform and the destination computing platform are the same, the masking settings may indicate that no data fields are to be masked.

In this fourth instance, if the data in the records originated from source computing platform 130, dynamic blockchain masking computing platform 110 may mask the first record to generate a first masked record based on masking settings for the combination of source computing platform 130 and destination computing platform 120. Dynamic blockchain masking computing platform 110 may determine that the masking settings for the combination of source computing platform 130 and destination computing platform 130 indicate that no masking is to be performed—thus, dynamic blockchain masking computing platform 110 may not generate any masked record corresponding to the second record (which, as noted above, comprises data from source computing platform 130 and is to be sent to destination computing platform 130). Dynamic blockchain masking computing platform 110 may mask the third record to generate a third masked record based on masking settings for the combination of source computing platform 130 and destination computing platform 140.

Figure 2C:
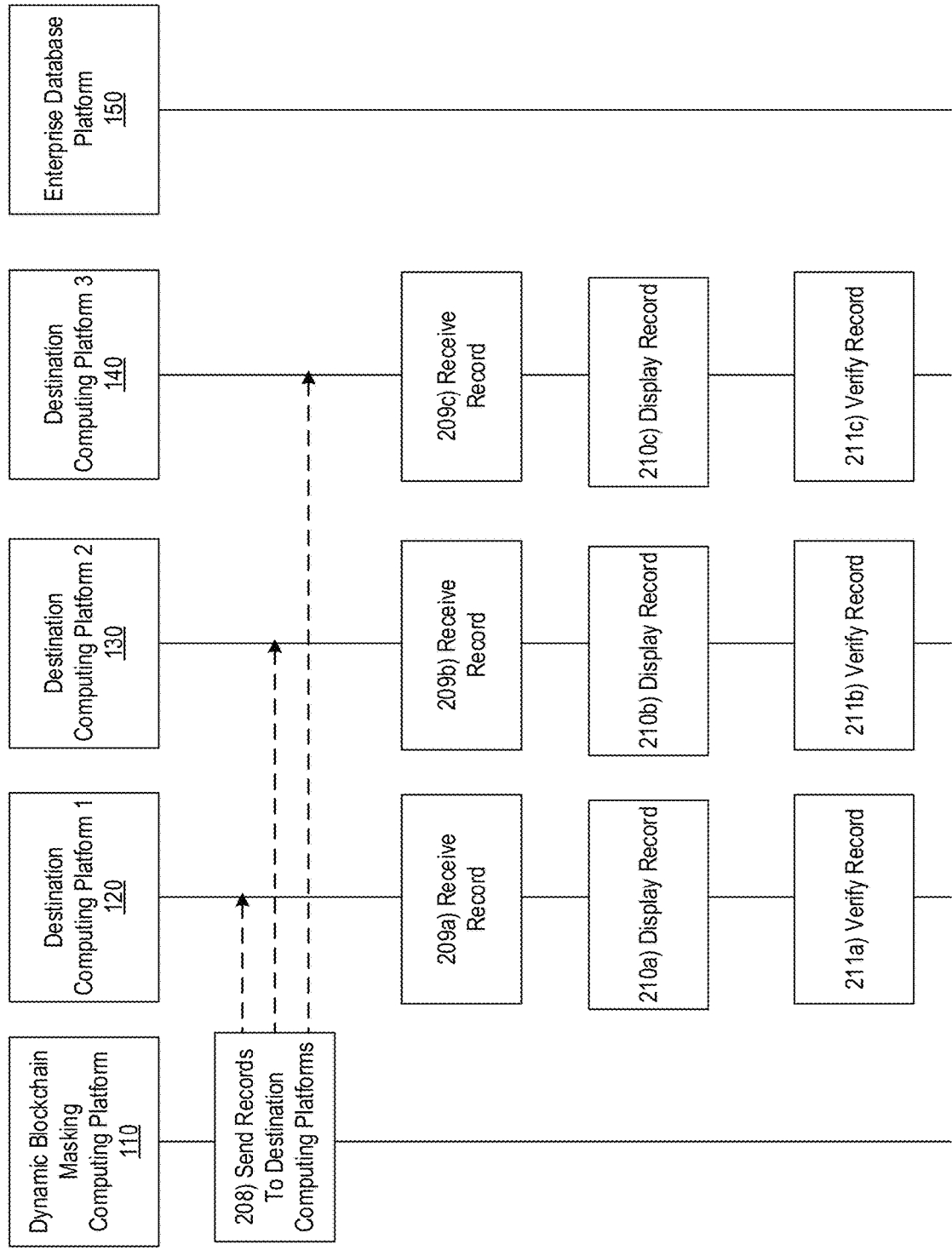

Referring to FIG. 2C, at step 208, dynamic blockchain masking computing platform 110 may send the records generated at step 205 or 207 to its intended destination computing platform. For each record generated at step 205 by dynamic blockchain masking computing platform 110, for which a corresponding masked record is generated by dynamic blockchain masking computing platform 110, at step 207, dynamic blockchain masking computing platform 110 will send, at step 208, the corresponding masked record generated at step 207 to the destination computing platform for that record. For each record generated at step 205 by dynamic blockchain masking computing platform 110, for which a corresponding masked record is not generated by dynamic blockchain masking computing platform 110 at step 207, dynamic blockchain masking computing platform 110 will send, at step 208, the record generated at step 205 to the destination computing platform for that record.

At steps 209a, 209b, and 209c, destination computing platform 120, destination computing platform 130, and destination computing platform 140 may receive the records from dynamic blockchain masking computing platform 110, respectively. Destination computing platform 120, destination computing platform 130, and destination computing platform 140 may store the records received from dynamic blockchain masking computing platform 110 subsequent to their receipt. This receiving and storing of records by the different computing platforms may occur in parallel or at different times.

At steps 210a, 210b, and 210c, destination computing platform 120, destination computing platform 130, and destination computing platform 140 may display the record received from dynamic blockchain masking computing platform 110, respectively. The display of the records may occur in parallel or at different times. The displayed record may include all of the data fields of the record received from dynamic blockchain masking computing platform 110, or a subset of the data fields.

At steps 211, 211b, and 211c, destination computing platform 120, destination computing platform 130, and destination computing platform 140 may verify the records received from dynamic blockchain masking computing platform 110. Verification of the records may comprise analysis of the contents of one or more data fields of the record and/or comparing those contents to stored data. Subsequent to verifying the records received from dynamic blockchain masking computing platform 110, each of destination computing platform 120, destination computing platform 130, and destination computing platform 140 may send a record verification notification to dynamic blockchain masking computing platform 110, indicating that the record has been verified. The record verification notification sent from each destination computing platform may identify that destination computing platform and comprise data identifying the particular record that has been verified by that destination computing platform.

Figure 2D:
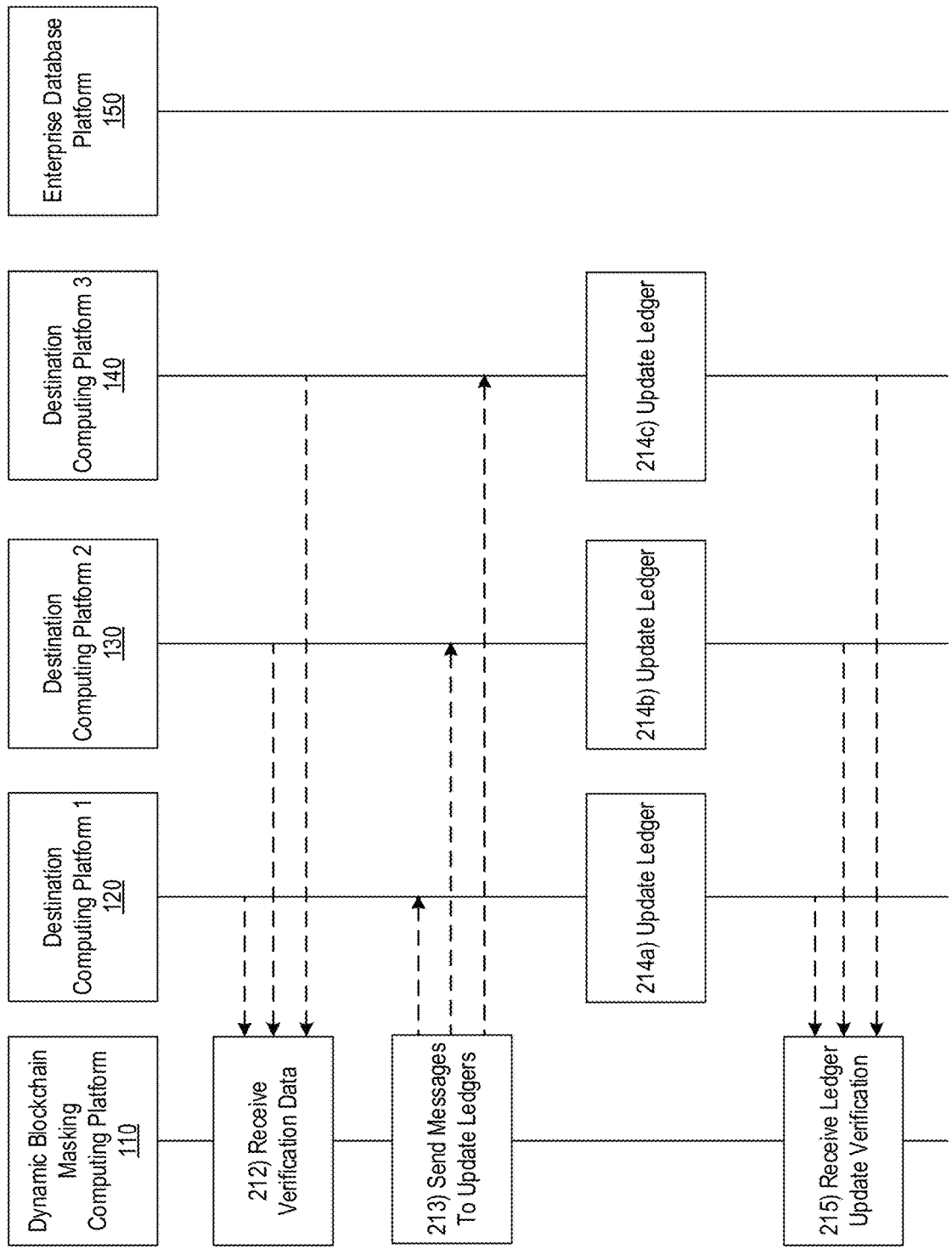

Referring to FIG. 2D, at step 212, dynamic blockchain masking computing platform 110 may receive a record verification notification from one or more of destination computing platform 120, destination computing platform 130, and destination computing platform 140. Dynamic blockchain masking computing platform 110 may confirm that a record verification notification is received from each destination computing platform to which a record was sent in step 208. In response to receiving a record verification notification from each destination computing platform to which a record was sent in step 208, dynamic blockchain masking computing platform 110 may, at step 213, send a message to each destination computing platform. The message may comprise an instruction to the destination computing platform to store the record received by the destination computing platform at step 209(a-c) in its distributed ledger. At step 214a, destination computing platform 120 may update its distributed ledger by storing the record received from dynamic blockchain masking computing platform 110 at step 209a in its distributed ledger. At step 214b, destination computing platform 130 may update its distributed ledger by storing the record it received from dynamic blockchain masking computing platform 110 at step 209b in its distributed ledger. At step 214c, destination computing platform 140 may update its distributed ledger by storing the record received from dynamic blockchain masking computing platform 110 at step 209c in its distributed ledger.

At step 215, dynamic blockchain masking computing platform 110 may receive ledger update verification notifications from one or more of destination computing platform 120, destination computing platform 130, and destination computing platform 140. The ledger update verification notification may indicate that the sending destination computing platform has updated its distributed ledger as instructed by the dynamic blockchain masking computing platform 110 in step 213. The dynamic blockchain masking computing platform 110 may confirm that a ledger update verification notification has been received from every destination computing platform to which a ledger update instruction was sent in step 213.

Figure 2E:
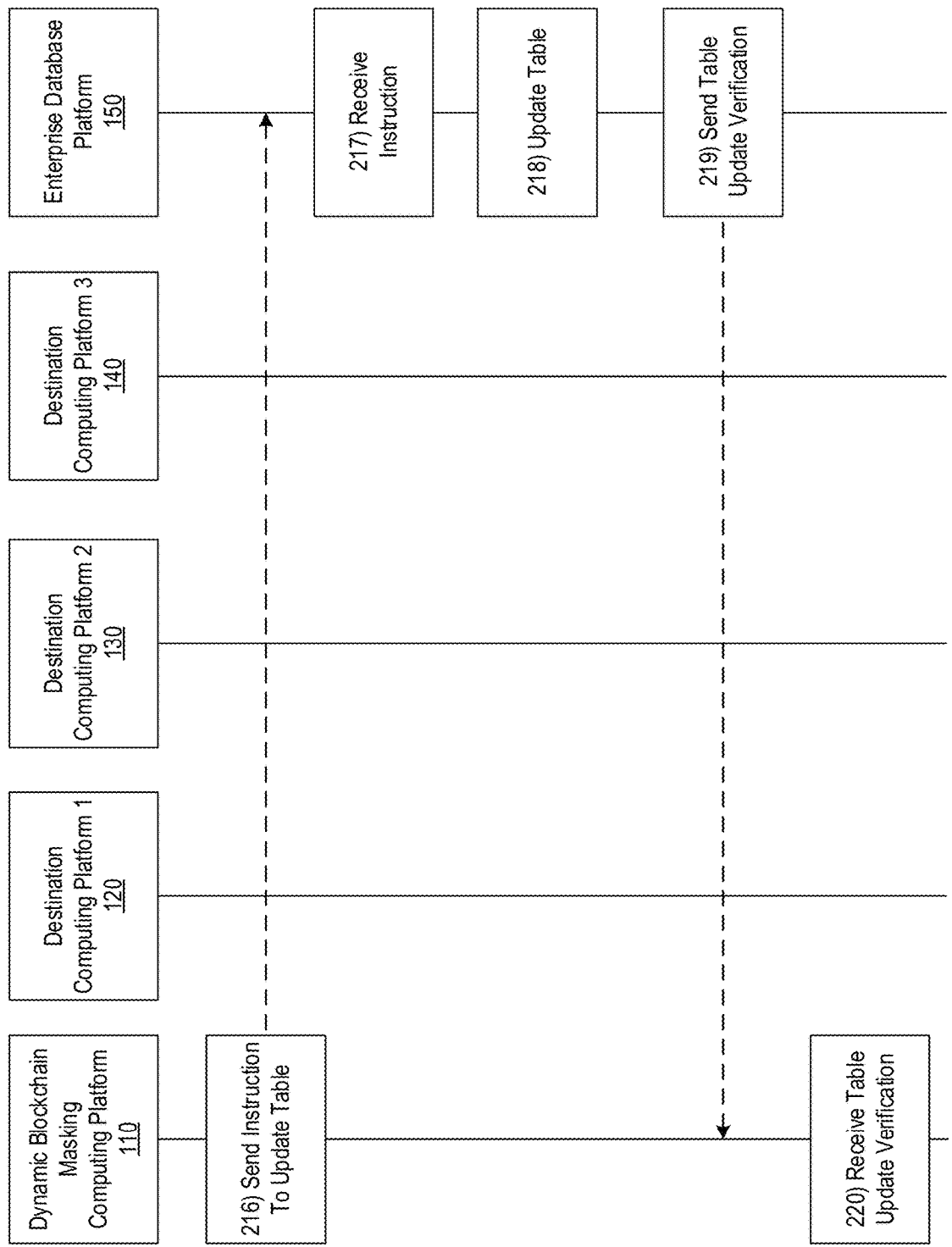

Referring to FIG. 2E, in response to confirming that a ledger update verification notification has been received from every destination computing platform to which a ledger update instruction was sent in step 213, dynamic blockchain masking computing platform 110 may, at step 216, send an instruction to enterprise database platform 150 to update one or more tables stored therein with a record corresponding to the record(s) generated at step 205. The instruction may include the record and a listing of each destination computing platform that has verified the record and added the record to its distributed ledger. At step 217, enterprise database platform 150 may receive the instruction (including the record) from dynamic blockchain masking computing platform 110. At step 218, enterprise database platform 150 may update, in response to receiving the instruction, one or more tables stored therein to include the record received from dynamic blockchain masking computing platform 110 at step 217. Subsequent to updating its tables, enterprise database platform 150 may, at step 219, send a table update verification notification to dynamic blockchain masking computing platform 110. The table update verification notification may indicate that enterprise database platform 150 has updated its table to include the record sent by dynamic blockchain masking computing platform 110 to enterprise database platform 150 at step 217. At step 220, dynamic blockchain masking computing platform 110 may receive the table update verification notification from enterprise database platform 150. Upon receipt of this table update verification notification, processing for the dataset received by dynamic blockchain masking computing platform 110 at step 203 may conclude. All of steps 201-220 may be repeated upon receipt of another data file by enterprise database platform 150 (or dynamic blockchain masking computing platform 110, computing platform 120, computing platform 130, or computing platform 140).

FIGS. 3A-3G illustrate graphical user interfaces that may be used to configure the masking settings. Although the discussion below references to the use of the graphical user interfaces by destination computing platform, the illustrated graphical user interfaces may additionally or alternatively be utilized by any of enterprise database platform 150, computing platform 120, computing platform 130, and/or computing platform 140 to configure masking settings. As discussed above, the graphical user interfaces may be generated by dynamic blockchain masking computing platform 110. The dynamic blockchain masking computing platform 110 may send the graphical user interfaces to a display device (such as a display device of dynamic blockchain masking computing platform 110, computing platform 120, computing platform 130, computing platform 140, or enterprise database platform 180). The sending of the graphical user interfaces to the display device (of dynamic blockchain masking computing platform 110, computing platform 120, computing platform 130, computing platform 140, or enterprise database platform 180) may cause the display device to display the graphical user interfaces. One or more user selections may be received through the graphical user interface. These user selections may be sent to the dynamic blockchain masking computing platform 110, which may receive the user selections received through the graphical user interface. The masking settings may then be configured using the user selection received via the graphical user interfaces.

FIG. 3A illustrates an initial graphical user interface 305 that may be presented to a user during the configuration of masking settings. The graphical user interface may be generated by dynamic blockchain masking computing platform 110. Dynamic blockchain masking computing platform 110 may send the graphical user interface 305 to a display device, and this sending may cause the display device to display graphical user interface 305. As noted above, masking settings may be uniformly applied to all records processed by dynamic blockchain masking computing platform 110, or may be customized based on the source computing platform and/or the destination computing platform. Subsequent to display of the initial graphical user interface 305, dynamic blockchain masking computing platform 110 may receive a user selection of "Uniform Masking" or "Custom Masking" from the display device.

In response to a user selection of "Uniform Masking" from the graphical user interface 305, the display device may send the user selection to dynamic blockchain masking computing platform 110. In response to receiving the user selection from the display device, via graphical user interface 305, dynamic blockchain masking computing platform 110 may generate graphical user interface 310, shown in FIG. 3B. Dynamic blockchain masking computing platform 110 may send the graphical user interface 310 to a display device, and this sending may cause the display device to display graphical user interface 310.

Graphical user interface 310 may include one or more selectable data fields. The user can then select the particular data fields to be masked by dynamic blockchain masking computing platform 110. Certain data fields may be designated as non-maskable by any of dynamic blockchain masking computing platform 110, enterprise database platform 150, computing platform 120, computing platform 130, and/or computing platform 140. These data fields may be grayed out and un-selectable by the user. Once the user has selected the data fields to be masked in all records processed by dynamic blockchain masking computing platform 110, the user may select the "Complete Configuration" button to complete the configuration of the masking settings. The display device may then send the user selections to dynamic blockchain masking computing platform 110, which may receive the user selections from the display device via graphical user interface 310. Dynamic blockchain masking computing platform 110 may then configure the one or more masking settings based on the user selections such that data fields marked as "Mask" by the user via the graphical user interface are indicated as such in the one or more masking settings, and data fields marked as "Do Not Mask" by the user via the graphical user interface are indicated as such in the one or more masking settings.

In response to a user selection of "Custom Masking" in the graphical user interface 305, the display device may send the user selection to dynamic blockchain masking computing platform 110. In response to receiving the user selection from the display device, via graphical user interface 305, dynamic blockchain masking computing platform 110 may generate graphical user interface 315, shown in FIG. 3C. Graphical user interface 315 may include a list of the source computing platforms and destination computing platforms. The user may select any of the listed computing platforms. In one example, to customize masking settings for records originating from a particular source computing platform, the user may select just the particular source platform (the user may also select only multiple source platforms to customize masking settings for records originating from any of the selected multiple source platforms). In a second example, to customize masking settings for records destined for a particular destination computing platform, the user may select just the particular destination platform (the user may also select only multiple destination platforms to customize masking settings for records destined for any of the selected multiple destination computing platforms). In a third example, to customize masking settings for records originating from a particular source computing platform and destined for a particular destination computing platform, the user may select the particular source computing platform and the particular destination computing platform. The user may select any number/combination of source computing platforms and/or destination computing platforms for which masking settings are to be configured.

Upon selection of one or more source computing platforms and/or destination computing platforms, the user may select the "Continue" button. In response to selection of the "Continue" button, the display device may send the user selections to dynamic blockchain masking computing platform 110. In response to receiving, from the display device and via the graphical user interface 315, the user selections, dynamic blockchain masking computing platform 110 may generate graphical user interface 310. Dynamic blockchain masking computing platform 110 may send the graphical user interface 310 to a display device, and this sending may cause the display device to display graphical user interface 310.

The user may then select one or more data fields for masking for the selected source computing platform(s) and/or destination computing platform(s). As noted above, certain data fields may be unselectable by the user if those data fields have been designated as unmaskable. The one or more masking settings may then be configured based on the user selections such that data fields marked as "Mask" by the user via the graphical user interface are indicated as such in the one or more masking settings, and data fields marked as "Do Not Mask" by the user via the graphical user interface are indicated as such in the one or more masking settings. Once the user has selected the data fields to be masked in all records processed by dynamic blockchain masking computing platform 110, the user may select the "Complete Configuration" button to complete the configuration of the masking settings. The display device may then send the user selections to dynamic blockchain masking computing platform 110, which may receive the user selections from the display device via graphical user interface 310. Dynamic blockchain masking computing platform 110 may then configure the one or more masking settings based on the user selections such that data fields marked as "Mask" by the user via the graphical user interface are indicated as such in the one or more masking settings, and data fields marked as "Do Not Mask" by the user via the graphical user interface are indicated as such in the one or more masking settings.

FIG. 3D illustrates a graphical user interface 325 that includes user selections for masking settings for a particular destination computing platform, and FIG. 3E illustrates a sample masked record 330 generated for that particular destination computing platform based on the masking settings. As shown in graphical user interface 325, the user has configured the masking settings such that for all records generated for the particular destination computing platform, the second data field is masked, while the third data field and the fourth data field remain unmasked (along with the first data field, which is un-maskable). Accordingly, the record 330 generated by dynamic blockchain masking computing platform 110 includes an unmasked first data field ("Data A"), a masked second data field ("######"), an unmasked third data field ("Data B"), and an unmasked fourth data field ("Data C"). The record may include additional data, such as a cryptographic hash of a previous record and a data field identifying the particular destination computing platform ("ID").

FIG. 3F illustrates a graphical user interface 335 that includes user selections for masking settings for a particular source computing platform, and FIG. 3G illustrates a sample masked record 340 generated for any record comprising data originating from that particular source computing platform based on the masking settings. As shown in graphical user interface 335, the user has configured the masking settings such that for all records comprising data originating from that particular source computing platform, the second data field and the fourth data field are masked, while the third data field remains unmasked (along with the first data field, which is un-maskable). Accordingly, the record 340 generated by dynamic blockchain masking computing platform 110 includes an unmasked first data field ("Data A"), a masked second data field ("######"), an unmasked third data field ("Data B"), and a masked fourth data field ("(######"). The record may include additional data, such as a cryptographic hash of a previous record and a data field identifying the particular destination computing platform ("ID").

Figure 4:
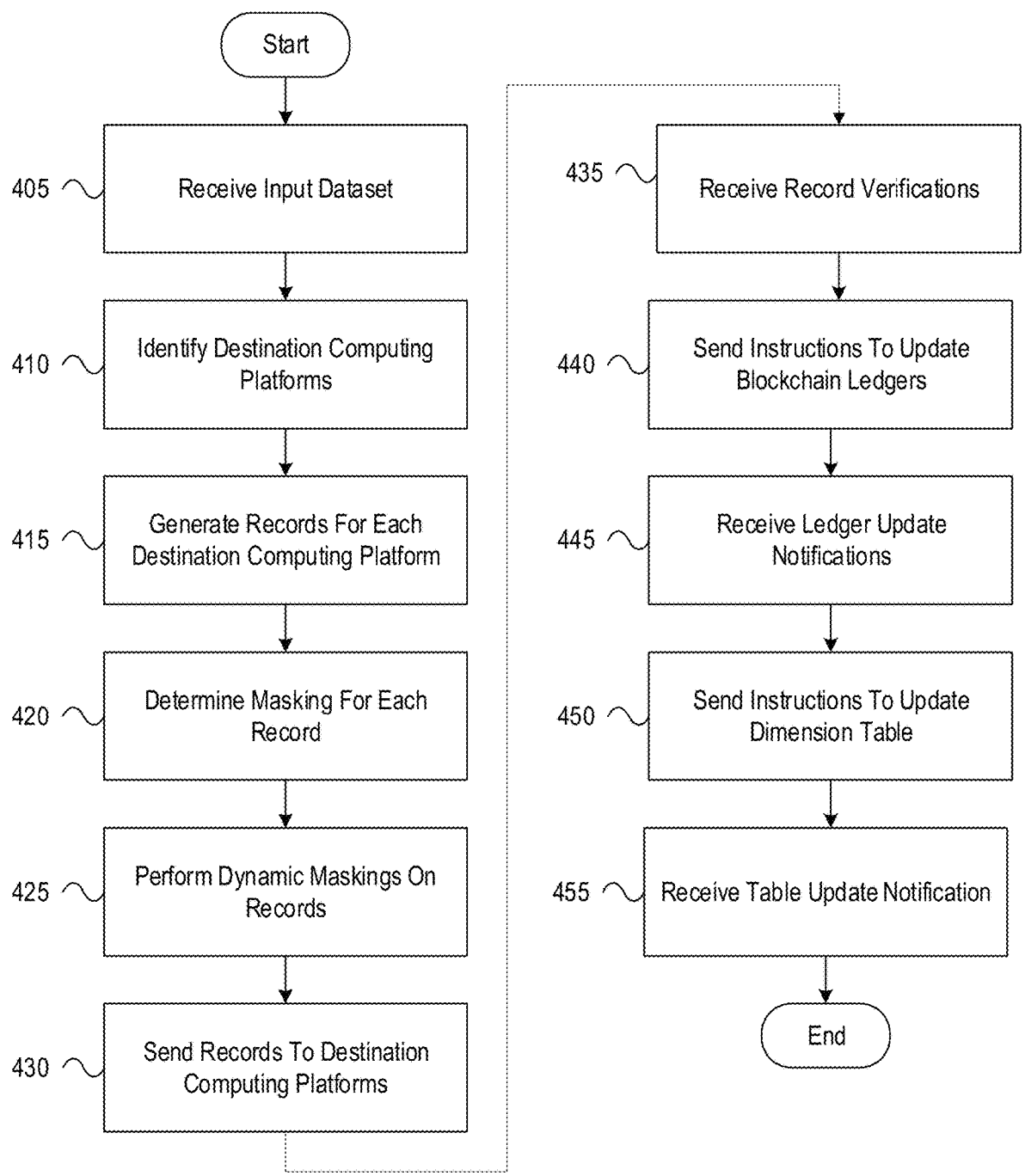
FIG. 4 depict an illustrative method for implementing a dynamic blockchain masking and verification computing platform in accordance with one or more example embodiments.

FIG. 4 depicts an illustrative method for implementing a dynamic blockchain masking and verification computing platform in accordance with one or more example embodiments. Referring to FIG. 4, at step 405, a computing platform having at least one processor, a communication interface, and memory may receive and store an input dataset. The computing platform may process the input dataset by extracting data from the input dataset. At step 410, the computing platform may identify one or more destination computing platforms for the data. The one or more destination computing platforms may be determined from the input dataset or may be dynamically determined by the computing platform. At step 415, the computing platform may generate records for each of the destination computing platforms identified in step 410. Each of the records may include the data from the input dataset and additional data such as data identifying a destination computing platform). Each of the records may be identical but for hash functions and data identifying the destination computing platform for any particular record. At step 420, the computing platform may determine which of the generated records are to be masked, based on one or more masking settings. The masking settings may be pre-stored by the computing platform or may be received by the computing platform as a part of steps 405-420. The masking settings may be received via one or more graphical user interfaces.

At step 425, the computing platform may generate one or more masked records. For each record generated by the computing platform at step 415, a corresponding masked record may be generated by the computing platform at step 425 based on masking settings. A masked record may not be generated for any record associated with a same source computing platform and destination computing platform. The masking settings may be uniformly applied to all records, or may be customized for one or more source computing platforms, one or more destination computing platforms, or any combination thereof.

At step 430, the computing platform may send the records to the destination computing platforms. For each record generated by the computing platform at step 415, and for which a corresponding masked record is generated by the computing platform at step 425, the computing platform may send only the masked record generated at step 425 to the destination computing platform. For each record generated by the computing platform at step 415, and for which no corresponding masked record is generated by the computing platform at step 425, the computing platform may send the record generated at step 415 to the destination computing platform.

At step 435, the computing platform may receive one or more record verification notifications. The computing platform may confirm that a record verification notification is received from every destination computing platform to which the computing platform sent a record at step 430. In response to receiving a record verification notification from every destination computing platform to which the computing platform sent a record at step 430, the computing platform may, at step 440, send messages comprising an instruction to each of those destination computing platforms to update their distributed ledgers with the records sent by the computing device at step 430. At step 445, the computing platform may receive notifications from one or more destination computing platforms indicating that their distributed ledgers have been updated to include the records sent at step 430. The computing platform may confirm that such a notification is received from every destination computing platform to which an instruction was sent at step 440. In response to receiving a notification from every destination computing platform to which an instruction was sent at step 450, the computing platform may send an instruction to a database platform to update its dimension table with the record. The record may include the data from the input dataset received at step 405. At step 455, the computing platform may receive a notification from the database platform that the table has been updated with the record.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:

at least one processor;

a communication interface communicatively coupled to the at least one processor; and memory storing computer-readable instructions that, when executed by the at least one processor, cause the computing platform to:

receive an input dataset;

generate, for a first destination computing platform and based on the input dataset, a first record;

generate, for a second destination computing platform and based on the input dataset, a second record;

generate a graphical user interface comprising a first selectable masking option and a second selectable masking option;

send the graphical user interface to a display device, wherein sending the graphical user interface to the display device causes the display device to display the graphical user interface;

in response to receiving, via the graphical user interface, a selection of the second selectable masking option, generate a second graphical user interface, the second graphical user interface comprising one or more selectable destination computing platforms and one or more selectable source computing platforms;

send the second graphical user interface to the display device, wherein sending the second graphical user interface to the display device causes the display device to display the second graphical user interface;

selectively mask, based on a first one or more masking settings, the first record, wherein selectively masking the first record produces a first masked record;

selectively mask, based on a second one or more masking settings, the second record, wherein selectively masking the second record produces a second masked record;

send the first record to the first destination computing platform;

send the second record to the second destination computing platform;

receive a first record verification from the first destination computing platform;

receive a second record verification from the second destination computing platform; and in response to receiving the first record verification from the first destination computing platform and receiving the second record verification from the second destination computing platform:

send a first message to the first destination computing platform, the first message comprising a first instruction to update a first distributed ledger with the first masked record; and
send a second message to the second destination computing platform, the second message comprising a second instruction to update a second distributed ledger with the second masked record.

2. The computing platform of claim 1, the memory storing computer-readable instructions that, when executed by the at least one processor, cause the computing platform to:
send an instruction to an enterprise database platform to store data from the input dataset, wherein sending the instruction to the enterprise database platform to store the data from the input dataset causes the enterprise database platform to store the data from the input dataset.

3. The computing platform of claim 2, wherein the input dataset is received from the enterprise database platform.

4. The computing platform of claim 1, the memory storing computer-readable instructions that, when executed by the at least one processor, cause the computing platform to:
in response to receiving, from the display device and via the graphical user interface, a selection of the first selectable masking option, generate a third graphical user interface, the third graphical user interface comprising a plurality of data fields; and
send the third graphical user interface to the display device, wherein sending the third graphical user interface to the display device causes the display device to display the third graphical user interface.

5. The computing platform of claim 4, the memory storing computer-readable instructions that, when executed by the at least one processor, cause the computing platform to:
receive, from the display device and via the third graphical user interface, a second selection of a first data field of the plurality of data fields,
wherein the first one or more masking settings comprises an indication that a data field in the first record corresponding to the first data field is to be masked.

6. The computing platform of claim 1, the memory storing computer-readable instructions that, when executed by the at least one processor, cause the computing platform to:
in response to receiving, from the display device and via the second graphical user interface, a selection of a second destination computing platform, generate a third graphical user interface, the third graphical user interface comprising a plurality of data fields;
send the third graphical user interface to the display device, wherein sending the third graphical user interface to the display device causes the display device to display the third graphical user interface; and
receive, from the display device and via the third graphical user interface, a second selection of a second data field of the plurality of data fields,
wherein the second one or more masking settings comprises an indication that a data field in the second record corresponding to the second data field is to be masked.

7. The computing platform of claim 1, the memory storing computer-readable instructions that, when executed by the at least one processor, cause the computing platform to:
generate, for a third destination computing platform and based on the input dataset, a third record; and
in response to determining, based on a third one or more masking settings, that the third record is to be sent without masking, send the third record to the third destination computing platform.

8. A method comprising:
at a computing platform comprising at least one processor, a communication interface, and memory:
receiving an input dataset;
generating, for a first destination computing platform and based on the input dataset, a first record;
generating, for a second destination computing platform and based on the input dataset, a second record;
generate a graphical user interface comprising a first selectable masking option and a second selectable masking option;
sending the graphical user interface to a display device, wherein sending the graphical user interface to the display device causes the display device to display the graphical user interface;
in response to receiving, via the graphical user interface, a selection of the second selectable masking option, generate a second graphical user interface, the second graphical user interface comprising one or more selectable destination computing platforms and one or more selectable source computing platforms;
sending the second graphical user interface to the display device, wherein sending the second graphical user interface to the display device causes the display device to display the second graphical user interface;
selectively masking, based on a first one or more masking settings, the first record, wherein selectively masking the first record produces a first masked record;
selectively masking, based on a second one or more masking settings, the second record, wherein selectively masking the second record produces a second masked record;
sending the first record to the first destination computing platform;
sending the second record to the second destination computing platform;
receiving a first record verification from the first destination computing platform;
receiving a second record verification from the second destination computing platform; and
in response to receiving the first record verification from the first destination computing platform and receiving the second record verification from the second destination computing platform:
sending a first message to the first destination computing platform, the first message comprising a first instruction to update a first distributed ledger with the first masked record; and
sending a second message to the second destination computing platform, the second message comprising a second instruction to update a second distributed ledger with the second masked record.

9. The method of claim 8, further comprising:
sending an instruction to an enterprise database platform to store data from the input dataset.

10. The method of claim 9, wherein the input dataset is received from enterprise database platform.

11. The method of claim 8, further comprising:
in response to receiving, from the display device and via the graphical user interface, a selection of the first selectable masking option, generating a third graphical user interface, the third graphical user interface comprising a plurality of data fields; and
sending the third graphical user interface to the display device, wherein sending the third user interface to the display device causes the display device to display the third graphical user interface.

12. The method of claim 11, further comprising:
receiving, from the display device and via the third graphical user interface, a second selection of a first data field of the plurality of data fields,
wherein the first one or more masking settings comprises an indication that a data field in the first record corresponding to the first data field is to be masked.

13. The method of claim 8, further comprising:
in response to receiving, via the graphical user interface, a selection of a second destination computing platform, generating a third graphical user interface, the third graphical user interface comprising a plurality of data fields;
sending the third graphical user interface to the display device, wherein sending the third graphical user interface to the display device causes the display device to display the third graphical user interface; and
receiving, from the display device and via the third graphical user interface, a second selection of a second data field of the plurality of data fields,
wherein the second one or more masking settings comprises an indication that a data field in the second record corresponding to the second data field is to be masked.

14. The method of claim 8, further comprising:
generating, for a third destination computing platform and based on the input dataset, a third record; and
in response to determining, based on a third one or more masking settings, that the third record is to be sent without masking, sending the third record to the third destination computing platform.

15. One or more non-transitory computer-readable media storing instructions that, when executed by a computing platform comprising at least one processor, a communication interface, and memory, cause the computing platform to:
receive an input dataset;
generate, for a first destination computing platform and based on the input dataset, a first record;
generate, for a second destination computing platform and based on the input dataset, a second record;
generate a graphical user interface comprising a first selectable masking option and a second selectable masking option;
send the graphical user interface to a display device, wherein sending the graphical user interface to the display device causes the display device to display the graphical user interface;
in response to receiving, via the graphical user interface, a selection of the second selectable masking option, generate a second graphical user interface, the second graphical user interface comprising one or more selectable destination computing platforms and one or more selectable source computing platforms;
send the second graphical user interface to the display device, wherein sending the second graphical user interface to the display device causes the display device to display the second graphical user interface;
selectively mask, based on a first one or more masking settings, the first record, wherein selectively masking the first record produces a first masked record;
selectively mask, based on a second one or more masking settings, the second record, wherein selectively masking the second record produces a second masked record;
send the first record to the first destination computing platform;
send the second record to the second destination computing platform;
receive a first record verification from the first destination computing platform;
receive a second record verification from the second destination computing platform; and
in response to receiving the first record verification from the first destination computing platform and receiving the second record verification from the second destination computing platform:
send a first message to the first destination computing platform, the first message comprising a first instruction to update a first distributed ledger with the first masked record; and
send a second message to the second destination computing platform, the second message comprising a second instruction to update a second distributed ledger with the second masked record.

16. The one or more non-transitory computer-readable media of claim 15, storing instructions that, when executed by the computing platform, cause the computing platform to:
generate, for a third destination computing platform and based on the input dataset, a third record; and
in response to determining, based on a third one or more masking settings, that the third record is to be sent without masking, send the third record to the third destination computing platform.

* * * * *